United States Patent

Hosoya et al.

[11] Patent Number: 5,395,219
[45] Date of Patent: Mar. 7, 1995

[54] HYDRAULIC PUMP HAVING CAM DRIVEN, SPRING BIASED PISTON

[75] Inventors: Yukio Hosoya; Kei Fukuyo, both of Shizuoka, Japan

[73] Assignee: Nisshinbo Industries, Inc., Tokyo, Japan

[21] Appl. No.: 130,200

[22] Filed: Oct. 1, 1993

[30] Foreign Application Priority Data

Oct. 2, 1992 [JP] Japan .................................. 4-287112

[51] Int. Cl.⁶ ............................................ F04B 21/04
[52] U.S. Cl. .................... 417/454; 417/549; 417/554; 277/59
[58] Field of Search ............... 417/454, 470, 471, 549, 417/554, 273, 569; 92/129; 277/16, 58, 59, 70

[56] References Cited

U.S. PATENT DOCUMENTS 4,534,711 8/1985 Wakatsuki .................... 417/273
5,039,283 8/1981 Mergenthaler et al. ............ 92/129

FOREIGN PATENT DOCUMENTS 1379727 10/1964 France ......................... 417/549
3722988 1/1989 Germany ..................... 417/273
4028941 8/1991 Germany ..................... 417/549
4027794 3/1992 Germany ..................... 417/273
167469 7/1989 Japan ......................... 417/273

Primary Examiner—Richard A. Bertsch
Assistant Examiner—Roland G. McAndrews, Jr.
Attorney, Agent, or Firm—Nikaido, Marmelstein, Murray & Oram

[57] ABSTRACT

A hydraulic pump including a housing having a housing bore with a piston sliding in an axial direction in the bore and a pump chamber being defined in cavity adjacent one end of the piston. A piston drive mechanism is provided in a housing chamber defined in the bore adjacent the other end of the piston. Piston return springs are mounted in the pump chamber biasing the piston towards the piston drive mechanism. An inlet valve is arranged in the pump chamber opening and closing an axial bore in the piston connected to an inlet passage. An outlet valve is set on a downstream side of the pump chamber opening and closing an outlet passage. Two elastic seal members are mounted around a circumference of the piston respectively sealing an area between the pump chamber and the inlet passage and an area between the inlet passage and the housing chamber.

6 Claims, 3 Drawing Sheets

HYDRAULIC PUMP HAVING CAM DRIVEN, SPRING BIASED PISTON

BACKGROUND OF THE INVENTION

This invention relates to a hydraulic pump that can be used as the pressure generator source in a pressure fluid device; more specifically, it relates to a hydraulic pump that can be used in an antilock brake system (ABS) or traction control system (TCS).

Conventional hydraulic pumps are of a variety of designs. For example, the pump disclosed in the Publication of Unexamined German Patent Application Number 3 236 536 is configured from a piston guide housed inside a housing cavity wherein a piston slides back and forth within the piston guide. This piston slides in one direction upon receipt of a drive force from the eccentric cam of the motor's drive shaft, then slides in the reverse direction upon receipt of the spring force of a piston return spring.

This hydraulic pump also includes a suction check valve and an exhaust check valve. When the piston backs up towards the eccentric cam by the spring force of the piston return spring, the exhaust check valve closes the fluid outlet line, wherein the suction check valve opens the fluid inlet line and sucks fluid into the pump chamber from the inlet line side.

A conventional hydraulic pump uses a mechanical sealing configuration around the outer circumference of the piston to seal that area between the pump chamber and the suction line side. A microscopic gap of the order of several microns occurs between the piston and the piston bore. This type of mechanical seal presents some problems as follows.

Components must be fabricated with very high precision. Moreover at high temperatures, the viscosity of the pressure fluid (for example brake fluid) decreases, causing a larger amount of fluid to leak out of the pump chamber and back into the suction line, which reduces the delivery capacity of the pump.

In using a mechanical seal configuration, since the piston is made from a very hard material such as a quenched steel, in order to prevent wear of the piston bore in which the piston slides, the piston guide which is made from a very hard material like steel must be interposed. This extra component adds to the cost of parts and to the cost of assembly.

Deviations from the manufacturing tolerances are unavoidable in the fabrication of the piston and piston bore. Selective matching of a piston to a piston bore of proper dimension to assure a clearance of several microns is required and is time and labor-consuming.

In a normal hydraulic pump, the space between the pump chamber and exit chamber is sealed by cladding two inelastic flat surfaces (the face of the piston guide and the face of the valve unit). Accordingly, the large contacted area reduces the surface pressure per unit of area of the contacted area, making it difficult to achieve a tight seal. As well, sealing effectiveness will be easily reduced by distortions and scratches in the contacted joint.

OBJECTS AND SUMMARY OF THE INVENTION

It is an object of this invention to provide a hydraulic pump which features ease-of-fabrication of the piston and piston housing bore. It is a second object of this invention to provide a hydraulic pump with fewer parts, therefore lighter and more compact. It is a third object of this invention to provide a hydraulic pump with stable fluid delivery.

This invention is a hydraulic pump comprised of a piston that slides in the axial direction inside a housing bore; a pump chamber housing piston return springs and being made at one end of the piston; a piston drive mechanism arranged in a housing chamber made at the other end of the piston; an inlet valve, arranged inside the pump chamber, that opens and closes a suction passage bored inside the piston; and an outlet valve set on the downstream side of the pump chamber, wherein the housing bore is made inside of a housing and the piston is inserted inside the housing bore. Two elastic sealing materials are interposed between the outer circumference of the piston and housing bore to seal that area between the pump chamber and the inlet passage and that area between the inlet passage and the housing chamber. The cross section surface of at least the seal positioned between the pump chamber and inlet passage is approximately a convex surface.

Further, in the hydraulic pump of this invention, the housing bore is made to be of non-uniform diameter over its length; wherein the piston is housed inside a small-diameter bore, and an outlet valve is housed inside a large-diameter bore; and wherein the end face of the outlet valve is pressed to make rim contact to the stepped face formed at the interface between the large-diameter, bore and the small-diameter bore, to seal the area between the pump chamber and the exit chamber.

Moreover, in the hydraulic pump of this invention, the outlet valve comprises a plug, arranged on the side exposed to the atmosphere, and containing a sealing material, mounted on the stepped face around the outer circumference of the exit chamber, that seals the area between the atmosphere side of the outlet valve and the exit chamber; a valve seat, arranged on the pump chamber side and supported by the plug; springs housed inside the valve chamber between the plug and valve seat; and a valve body energized by the springs and seated inside the valve ring of the valve seat; wherein a fluid passage is made on the plug side of the valve seat to connect the valve chamber and the exit chamber, and the sealing material is supported by a washer sandwiched between the plug and the valve seat.

Accordingly, this invention as explained above is effective as follows.

The hydraulic pump of this invention has two seals interposed around the external circumference of the piston which provide a good seal between the piston and the housing bore. At the same time, these seals enable the piston to be supported at a suitable gap from the housing bore. Thus, the piston made from a hard material can be housed directly inside the housing bore by imposing a relatively soft material, without the use of a piston guide formed from a very hard material as employed in conventional hydraulic pumps. Accordingly, there are fewer parts, and a lighter, more compact pump can be produced at lesser cost.

The clearance and the tolerance between the external surface of the piston and the housing bore can be fairly large; therefore the requirement for machining precision for these parts can be relaxed. Also, selective matching of the piston to the housing bore of the right dimensions is not required, and fabrication costs will be reduced.

The delivery capacity of the hydraulic pump is retained even at high temperatures.

The cross section surface of one of the two seals, specifically that seal between the inlet passage and the pump chamber has approximately a convex texture. This reduces the resistance to the sliding piston. Moreover, it prevents the lip of the seal from biting into the gap between the housing bore and the piston surface.

The angled rim of the outlet valve is passed to make rim contact to the stepped face of the housing bore, thus forming a seal between the pump chamber and the exit chamber. Since the contacted area of the seal is smaller than in conventional pumps, the surface pressure per unit area of the contacted surface becomes larger, creating a better seal and preventing a loss of sealing effectiveness caused by distortions or scratches in the contacted area.

The O-ring mounted externally around the plug is sandwiched by a thin plate washer on the exit chamber side, which enables the overall length of the plug to be shortened.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENT

An example of this invention is explained below with reference to the attached figures.

Figure 1:
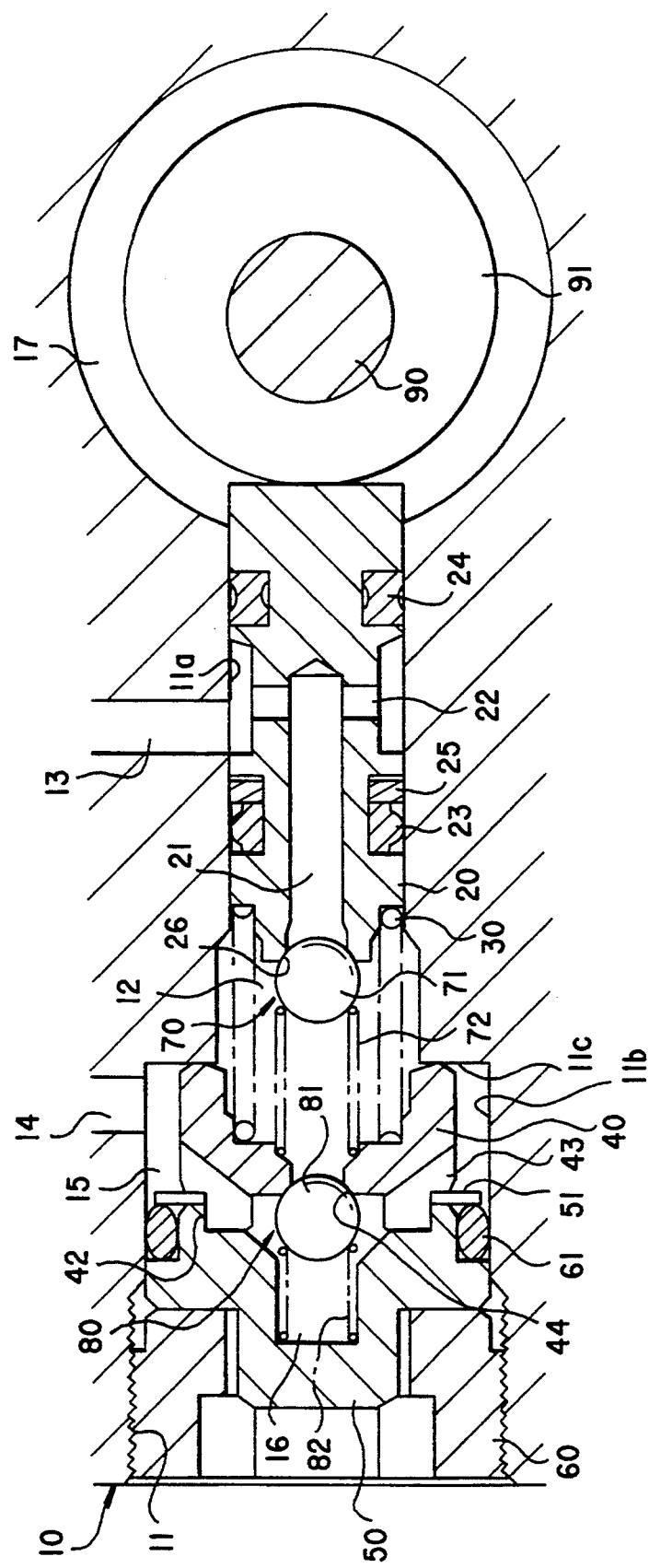
FIG. 1 is a longitudinal diagram of the hydraulic pump of this invention as embodied in Example 1.

An example of a hydraulic pump configuration is shown in FIG. 1. The hydraulic pump comprises a piston 20, stroking in the axial direction, housed directly inside the small-diameter bore 11a of a housing bore 11 bored step wise of non-uniform diameter inside the housing 10; a drive mechanism which drives the piston 20 in the axial direction; a pump chamber 12, inside the housing bore 11, housing piston return springs 30; and two valve arrangements positioned on either side of the pump chamber 12.

The housing bore 11 houses, in sequence from the base end, the piston 20, the piston return springs 30, a valve seat 40, and a plug 50. A screw threaded member 60 clamps the plug 50 against the valve seat 40.

As shown in FIG. 1, an inlet passage 13 is connected to the small-diameter bore 11a, and an outlet passage 14 to the large-diameter bore 11b of the housing bore 11.

The piston 20 has a bore 21 extending along the axial center of the piston for a fixed distance from one end of the piston. The bore 21 is connected to the injection passage 22 bored radially to the outer circumference of the piston 20. The inlet passage 13, the injection passage 22 connected to the inlet passage 13, and the bore 21 form a suction passage which feeds the pressure fluid to the pump chamber 12.

Two ring-shaped seals 23,24, molded from an elastic material, are fitted in respective grooves around the outer circumference of the piston 20 on either side of the injection passage 22. Seal 23 is combined with a backup ring 25. Seal 23 seals the area around the outer surface of the piston 20 between the inlet passage and the pump chamber 12. The other seal 24 seals the area around the outer surface of the piston 20 between the inlet passage and the housing chamber 17 which houses the eccentric cam 91.

It is preferable that the cross section surface of seal 23, sealing that space between the inlet passage and the pump chamber 12 which generates a high pressure, be approximately a convex surface. This type of cross section surface provides less resistance to the sliding piston than does a circular surface like an O-ring or a square-wave surface. Moreover, this shape prevents the lip of the seal 23 from biting into the microscopic gap formed around the circumference between the housing bore 11 and the piston 20, thus preventing any damage to the lip. A back up ring 25 made of polytetraflouroethylene, known as Teflon set adjacent to the seal 23 provides further protection against the lip of the seal 23 biting into the gap.

One end (the top end in FIG. 1) of the piston 20, housed directly inside the small-diameter bore 11a of the housing bore 11, abuts the outer perimeter of an eccentric cam 91 mounted to be eccentric to the center of rotation of the motor drive shaft 90. The piston 20 slides in any one direction only to a distance equal to twice the degree of eccentricity. The piston 20 receives the spring force of the piston return springs 30, compressed between the piston and the valve seat 40, which constantly energize the piston 20 in the direction to abut the eccentric cam 91.

Figure 2:
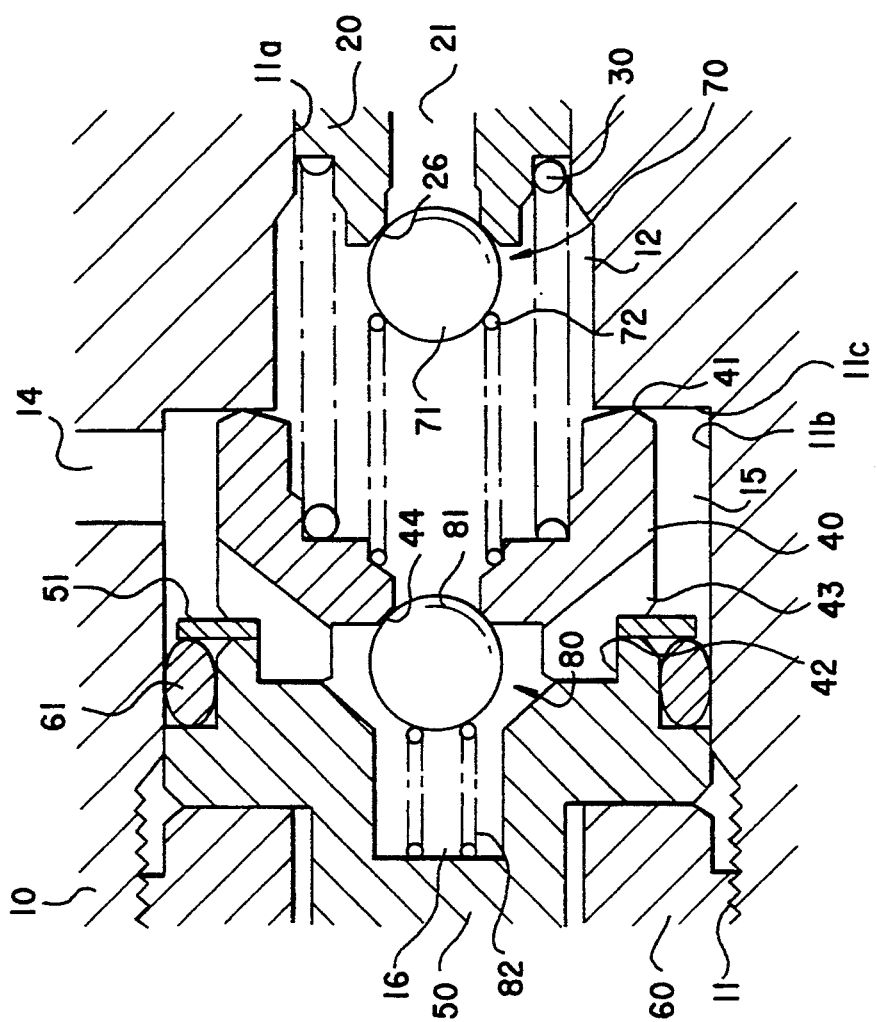
FIG. 2 is an enlarged diagram of the pump chamber.

As shown in FIG. 2, the valve seat 40 housed in the large-diameter bore 11b of the housing bore 11 is a cylindrical body with an external diameter smaller than the inner diameter of the large-diameter bore 11b. On one end (top side in FIG. 2) of the valve seat, a ring-shaped angled rim 41 is pressure seam welded to the stepped face 11c of the housing bore 11. This angled rim 41 maintains a good seal while also dividing the pump chamber 12 from the exit chamber 15. The cladding force of the angled rim 41 and the stepped face 11c is adjusted by the compressive force of the screw threaded member 60 screwed into the large-diameter bore 11b of the housing cavity 11.

The volume of the pump chamber 12, separating the piston 20 and the valve seat 40, increases or decreases as a function of the sliding piston. However, the volume of the exit chamber 15, made around the circumference between the inner wall of the large-diameter bore 11b and the exterior circumference of the valve seat 40, remains constant regardless of the position of the piston.

The other end (bottom side in FIG. 2) of the valve seat 40 comprises a small-diameter segment 42 made around the exterior of the valve seat. A plug 50 is fitted on the exterior of the segment 42 with the use of a washer 51. A slit 43, opened on the other end of the valve seat 40, maintains constant passage between the exit chamber 15 and the valve chamber 16 molded on the interior of the plug 50. The atmosphere side of the exit chamber 15 is sealed by the O-ring 61 set between the outer circumference of the plug 50 and the washer 51. The O-ring 61 can be inserted into a groove made around the outer circumference of the plug 50, but in this case, the overall length of the plug 50 must be lengthened by an amount equal to the width of the groove. However, the design of this example is advantageous in that since the O-ring is sandwiched by a thin plate washer 51 on the exit chamber 15 side, the overall length of the plug 50 can be shortened.

The pump chamber 12 has an inlet valve 70 and an outlet valve 80 fitted on the upstream side and downstream side respectively. As shown in the enlarged diagram of FIG. 2, the inlet valve 70 comprises valve ring 26 made at the inlet of the bore 21 of the piston 20 facing the pump chamber 12; a valve body 71 that sits on the valve ring 26, and springs 72 that receive the reactive force from the valve seat 40 and bias the valve body 71 in the direction to close the valve. The outlet valve 80 comprises a valve ring 44 made along the axial center of valve seat 40 facing the valve chamber 16, a valve body 81 that sits on the valve ring 44, and springs 82 compressed between the plug 50 and the valve body 81.

As shown in FIG. 1, the inlet valve 70 opens and closes the pressure fluid line connecting the injection passage 22 and the pump chamber 12; the outlet valve 80 opens and closes the pressure fluid line connecting the pump chamber 12 and the exit chamber 15.

In a conventional hydraulic pump, housing a piston 20 made from a hard material directly inside a housing cavity 11 (small-diameter bore 11a) made from a soft material such as an aluminum alloy would cause severe erosion of the housing bore 11 (small-diameter bore 11a) as the outer surface of the piston 20 slides and rubs against its inner surface; accordingly a piston guide made from a very hard material is inserted to envelop the piston.

This invention enables the piston 20 made from a hard material to be housed directly inside the housing bore 11 (small-diameter bore 11a) made from a soft material without the use of a hard piston guide. Rather, the piston 20 is separated from the housing bore 11 (small-diameter bore 11a) and supported by seals 23, 24 formed from elastic material and mounted around the outer circumference of piston 20, that seal the space between the pump chamber 12 and the inlet passage, and the space between the inlet passage and the housing chamber 17 respectively.

In other words, during the operation of the piston 20, to be discussed below, the piston 20 slides inside the housing bore 11 (small-diameter bore 11a) by means of the seals 23, 24, wherein the outer surface of the piston 20 barely, if at all, touches the inner surface of the housing bore 11, and the force of any contact is minimal. This eliminates abrasion and erosion of the relatively soft housing bore 11 (small-diameter bore 11a) caused by direct contact with the hard piston 20.

The operation of the hydraulic pump is explained below.

Figure 3:
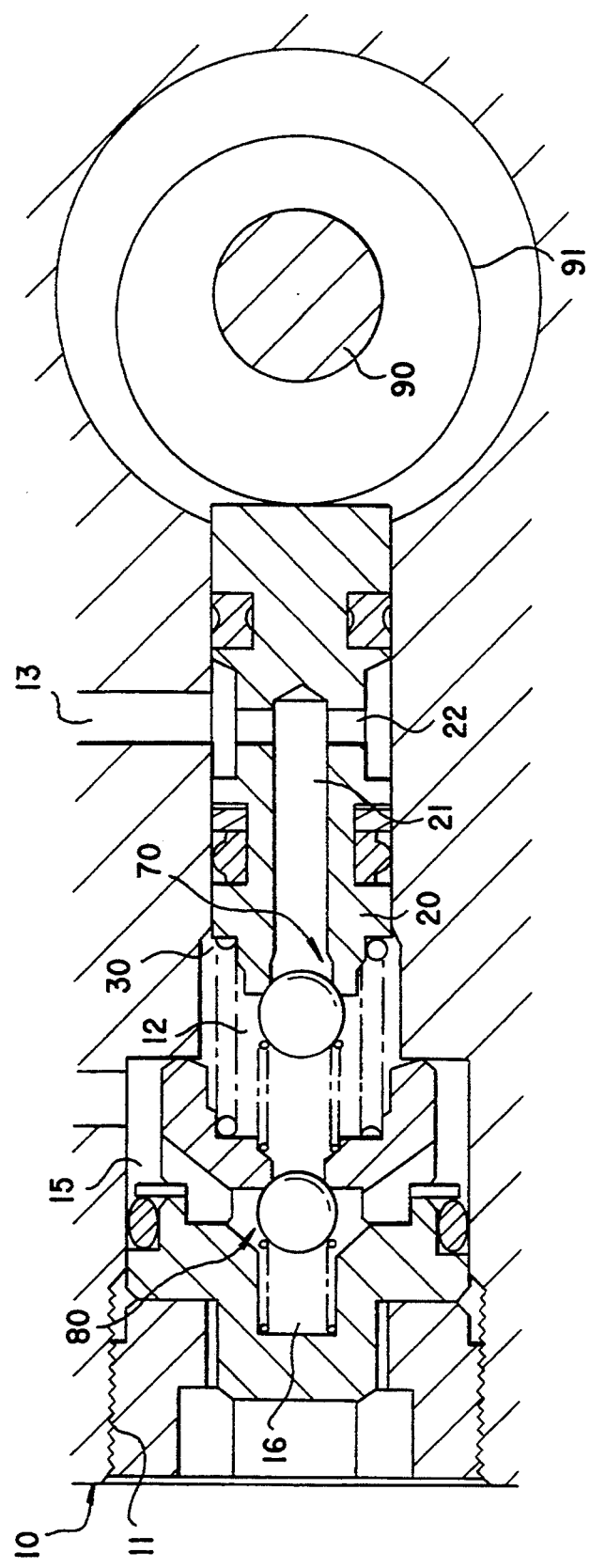
FIG. 3 is a longitudinal diagram to explain the operation of the hydraulic pump.

FIG. 3 shows the state in which the piston 20 has reached the upper dead end. Here, the piston return springs 30 urge the piston 20 towards the eccentric cam 91; the end face of the piston 20 abuts the perimeter of the eccentric cam 91, which regulates the backup position of the piston.

The inlet valve 70 set on the upstream side of the pump chamber 12 is closed to block passage between the inlet passage and the pump chamber 12; as well, the outlet valve 80 set on the downstream side of the pump chamber 12 is also closed to block passage through the pressure fluid line between the pump chamber 12 and the exit chamber 15.

In this state, if the motor, not shown in the figures, is started, the motor's drive shaft 90 rotates and turns the eccentric cam 91. As the eccentric cam 91 rotates, the regulated backup position of the piston 20 shifts towards the motor drive shaft 90, wherein the piston 20 receives the spring force of the piston return springs 30 and the piston backs up from the position in FIG. 3 to the lower dead end position as shown in FIG. 1.

As the piston 20 backs up, the capacity of the pump chamber 12 gradually expands, creating a vacuum pressure within the pump chamber 12. This vacuum pressure acts to close the outlet valve 80 and open the inlet valve 70; wherein the pressure fluid is sucked from the inlet passage 13 and into the pump chamber 12 via the injection passage 22, the bore 21, and the inlet valve 70.

When the eccentric cam 91 continues to rotate, as the reversing piston 20 goes beyond the lower dead point, the piston 20 switches direction to slide in the direction to compress the volume of the pump chamber 12, and advances forward from the state shown in FIG. 1 to that shown in FIG. 3.

As the piston 20 resists the force of the piston return springs 30 and advances forward, the pressure within the pump chamber 12 starts to rise; this increase in pressure acts to close inlet valve 70 and open the outlet valve 80; whereupon the pressure fluid within the pump chamber 12 is delivered out of the open outlet valve 80, through the exit chamber 15, and into the outlet passage 14. The pressure fluid continues to be delivered as the suction and delivery processes are repeated.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A hydraulic pump comprising:
    a housing having a housing bore with an axis;
    a piston sliding in an axial direction in said bore, a pump chamber being defined by said bore adjacent one end of said piston;
    a piston drive mechanism in a housing chamber defined in said bore adjacent the other end of said piston;
    piston return springs mounted in said pump chamber biasing said piston towards said piston drive mechanism;
    an inlet valve arranged in said pump chamber opening and closing an axial bore in said piston connected to an inlet passage;
    an outlet valve set on a downstream side of said pump chamber opening and closing an outlet passage; and
    two elastic seal members mounted around a circumference of said piston respectively sealing an area between said pump chamber and said inlet passage and an area between said inlet passage and said housing chamber.

2. A hydraulic pump as claimed in claim 1, wherein a cross-section surface of at least the seal member of said two seal members sealing between said pump chamber and said inlet passage is approximately a convex surface with respect to the circumferential surface of said piston.

3. A hydraulic pump as claimed in claim 1 wherein said housing bore includes a small diameter portion, a large diameter portion and a stepped face formed at an interface therebetween, said piston being housed in said small diameter portion and said outlet valve being housed in said large diameter portion, an end of said outlet valve being pressed to make rim contact to said stepped face to seal between said pump chamber and an exit chamber.

4. A hydraulic pump as claimed in claim 2 wherein said housing bore includes a small diameter portion, a large diameter portion and a stepped face formed at an interface therebetween, said piston being housed in said small diameter portion and said outlet valve being housed in said large diameter portion, an end of said outlet valve being pressed to make rim contact to said stepped face to seal between said pump chamber and an exit chamber.

5. A hydraulic pump comprising:
a housing having a housing bore with an axis;
a piston sliding in an axial direction in said bore, a pump chamber being defined in said bore adjacent one end of said piston;
a piston drive mechanism in a housing chamber defined in said bore adjacent the other end of said piston;
piston return springs mounted in said pump chamber biasing said piston towards said piston drive mechanism;
an inlet valve arranged in said pump chamber opening and closing an axial bore in said piston connected to an inlet passage;
an outlet valve set on a downstream side of said pump chamber opening and closing an outlet passage; and
two elastic seal members mounted around a circumference of said piston respectively sealing an area between said pump chamber and said inlet passage and an area between said inlet passage and said housing chamber;
said housing bore including a small diameter portion, a large diameter portion and a stepped face formed at an interface therebetween, said piston being housed in said small diameter portion and said outlet valve being housed in said large diameter portion, an end of said outlet valve being pressed to make rim contact to said stepped face to seal between said pump chamber and an exit chamber;
said outlet valve comprising a cylindrical valve seat body having said outlet valve end and a valve ring, said body and said large diameter portion of said bore defining said exit chamber; a plug closing an end of said large diameter portion of said bore from the atmosphere and having a plug seal sealing said exit chamber from the atmosphere, said valve seat body being supported by said plug, said plug having a valve chamber open to said exit chamber adjacent to said valve seat body and facing said valve ring; a washer sandwiched between said plug and said valve seat body supporting said plug seal; and valve springs in said valve chamber biasing a valve body into contact with said valve ring.

6. A hydraulic pump comprising:
a housing having a housing bore with an axis;
a piston sliding in an axial direction in said bore, a pump chamber being defined in said bore adjacent one end of said piston;
a piston drive mechanism in a housing chamber defined in said bore adjacent the other end of said piston;
piston return springs mounted in said pump chamber biasing said piston towards said piston drive mechanism;
an inlet valve arranged in said pump chamber opening and closing an axial bore in said piston connected to an inlet passage;
an outlet valve set on a downstream side of said pump chamber opening and closing an outlet passage; and
two elastic seal members mounted around a circumference of said piston respectively sealing an area between said pump chamber and said inlet passage and an area between said inlet passage and said housing chamber;
a cross-section surface of at least the seal member of said two seal members sealing between said pump chamber and said inlet passage is approximately a convex surface with respect to a circumferential surface of said piston;
said housing bore including a small diameter portion, a large diameter portion and a stepped face formed at an interface therebetween, said piston being housed in said small diameter portion and said outlet valve being housed in said large diameter portion, an end of said outlet valve being pressed to make rim contact to said stepped face to seal between said pump chamber and an exit chamber;
said outlet valve comprising a cylindrical valve seat body having said outlet valve end and a valve ring, said body and said large diameter portion of said bore defining said exit chamber; a plug closing an end of said large diameter portion of said bore from the atmosphere and having a plug seal sealing said exit chamber from the atmosphere, said valve seat body being supported by said plug, said plug having a valve chamber open to said exit chamber adjacent to said valve seat body and facing said valve ring; a washer sandwiched between said plug and said valve seat body supporting said plug seal; and valve springs in said valve chamber biasing a valve body into contact with said valve ring.

* * * * *